US011321218B1

(12) United States Patent
Hicks et al.

(10) Patent No.: US 11,321,218 B1
(45) Date of Patent: May 3, 2022

(54) AUTOMATED GENERATION OF SOURCE CODE MODELS FROM MACHINE CODE FOR CODE ANALYSIS

(71) Applicant: Correct Computation, Inc., College Park, MD (US)

(72) Inventors: Michael W. Hicks, Silver Spring, MD (US); B. S. Lavender, Brooklyn, NY (US); Anwar Mamat, Chantilly, VA (US); Ian Nicholas Sweet, College Park, MD (US)

(73) Assignee: Correct Computation, Inc., College Mark, MD (US)

( * ) Notice: Subject to any disclaimer, the term of this patent is extended or adjusted under 35 U.S.C. 154(b) by 0 days.

(21) Appl. No.: 17/194,940

(22) Filed: Mar. 8, 2021

(51) Int. Cl.
*G06F 11/36* (2006.01)
*G06F 8/71* (2018.01)
*G06F 9/22* (2006.01)

(52) U.S. Cl.
CPC ............ *G06F 11/3624* (2013.01); *G06F 8/71* (2013.01); *G06F 9/22* (2013.01); *G06F 11/3612* (2013.01)

(58) Field of Classification Search
CPC .......... G06F 8/71; G06F 9/22; G06F 11/3612; G06F 11/3624
See application file for complete search history.

(56) References Cited

U.S. PATENT DOCUMENTS

| | | | | |
|---|---|---|---|---|
| 6,233,733 B1 * | 5/2001 | Ghosh | ...................... | G06F 8/433 717/118 |
| 6,381,628 B1 * | 4/2002 | Hunt | ........................ | G06F 9/465 709/201 |
| 6,748,584 B1 * | 6/2004 | Witchel | ..................... | G06F 8/71 714/37 |
| 8,375,368 B2 * | 2/2013 | Tuck | ................... | G06F 11/3466 717/130 |
| 8,381,202 B2 * | 2/2013 | Papakipos | ................. | G06F 8/45 717/149 |
| 8,843,902 B2 * | 9/2014 | Stanford-Jason | ... | G06F 11/3604 717/132 |
| 10,203,968 B1 * | 2/2019 | Lawson | ..................... | G06F 8/54 |
| 10,209,962 B2 * | 2/2019 | Mishra | ....................... | G06F 8/53 |
| 10,387,585 B2 * | 8/2019 | Manoj Gangadhar | ....................... | G06F 11/3604 |
| 10,387,627 B2 * | 8/2019 | Johnson | .................. | G06F 21/10 |
| 10,871,950 B2 * | 12/2020 | De Smet | ................. | G06F 8/427 |

(Continued)

OTHER PUBLICATIONS

Ball, et al.,"Thorough Static Analysis of Device Drivers," Microsoft Corporation; EuroSys'06, Apr. 18-21, 2006, Leuven, Belgium, 14 pgs.

(Continued)

*Primary Examiner* — Douglas M Slachta
(74) *Attorney, Agent, or Firm* — Alliance IP, LLC

(57) ABSTRACT

In one embodiment, an application programming interface (API) and machine code associated with a software library are accessed. Data sources and data sinks in the software library are identified based on the API, and a data flow among the data sources and data sinks is determined based on a dynamic analysis of the machine code associated with the software library. A flow graph associated with the software library is then generated to represent the data flow among the data sources and data sinks, and a source code model associated with the software library is generated based on the flow graph.

20 Claims, 10 Drawing Sheets

(56) References Cited

U.S. PATENT DOCUMENTS

| | | | |
|---|---|---|---|
| 10,977,018 B1* | 4/2021 | Hwang | G06F 8/47 |
| 2012/0066698 A1* | 3/2012 | Yanoo | G06F 11/28 |
| | | | 719/330 |

OTHER PUBLICATIONS

Infer.com, "A tool to detect bugs in Java and C/C++/Objective-C code before it ships." As accessed Jun. 16, 2021 at https://fbinfer.com/, 5 pages.

* cited by examiner

Library API (lib.h)

```
// makes a sorter that holds up to sz
numbers
int *make(int sz);

// adds num to sorter of size sz
int add(int *sorter, int sz, int num);

// frees sorter
void destroy(int *sorter);
```
— 302

Library source code (lib.c)

```
int *make(int lim) {
    return calloc(lim, sizeof(int));
} int add(int *csort, int lim, int num) {
    int num_ok = 0 <= num && num < lim;
    if (!num_ok) { return 1; }
    csort[num] += 1;
    return 0;
} void destroy(int *csort)
{ free(csort); }
```
— 304

Application source code (app.c)

```
include "lib.h"

int main(int argc, char *argv[]) {
    int *csort = *make(10);
    int r, err;
    for (int i = 0; i < 100; i++) {
        r = rand () % 10 + 1;
        err = add(csort, 10, r);
        if (err) { return err; };
    }
    destroy(csort);
    return 0;
}
```
— 306

Library source code model (lib.c)

```
int *make(int lim)
{ return malloc(0); } int add(...)
{ return rand (); } void destroy(int *csort)
{ free(csort); }
```
308 —

FIG. 3

```
Library source code model (lib.c)
char *foo(char *p, char **q, int a){
  void *malloc1;
  void *malloc2;
  char *ret = 0;
  free(p);
  free(*(q));
  malloc1 = malloc(sizeof(char*));
  ret = malloc1;
  malloc2 = malloc(sizeof(char*));
  *(q) = malloc2;
  return ret;
}
```

```
Library source code model (lib.c)
char *foo(char *p, char **q, int a){
  void *malloc1;
  void *malloc2;
  char *ret = 0;
  if (rand()){
    free(p);
    free(*(q));
  }else{
    malloc1 = malloc(sizeof(char*));
    ret = malloc1;
    malloc2 = malloc(sizeof(char*));
    *(q) = malloc2;
  }
  return ret;
}
```

AUTOMATED GENERATION OF SOURCE CODE MODELS FROM MACHINE CODE FOR CODE ANALYSIS

TECHNICAL FIELD

The present disclosure relates in general to the field of computer development, and more specifically, to generating source code models from machine code for the purpose of code analysis.

BACKGROUND

In some cases, a computer program may be evaluated for correctness by analyzing its associated source code, such as to detect bugs (e.g., errors) in the program or otherwise verify that the program operates as intended. Analyzing all of the source code that makes up a particular program can be challenging, however, as a program often employs software libraries and functionality whose source code is either unavailable or too complex to analyze effectively. If those libraries are ignored, bugs and other errors in the program may be missed when evaluating the program for correctness, or non-errors may be falsely signaled as bugs.

BRIEF SUMMARY

According to one aspect of the present disclosure, an application programming interface (API) and machine code associated with a software library are accessed. Data sources and data sinks in the software library are identified based on the API, and a data flow among the data sources and data sinks is determined based on a dynamic analysis of the machine code associated with the software library. A flow graph associated with the software library is then generated to represent the data flow among the data sources and data sinks, and a source code model associated with the software library is generated based on the graph.

BRIEF DESCRIPTION OF THE DRAWINGS

FIG. 3 illustrates an example of generating a source code model for a software library for a code analysis on an application that uses the library.

DETAILED DESCRIPTION

Figure 1:
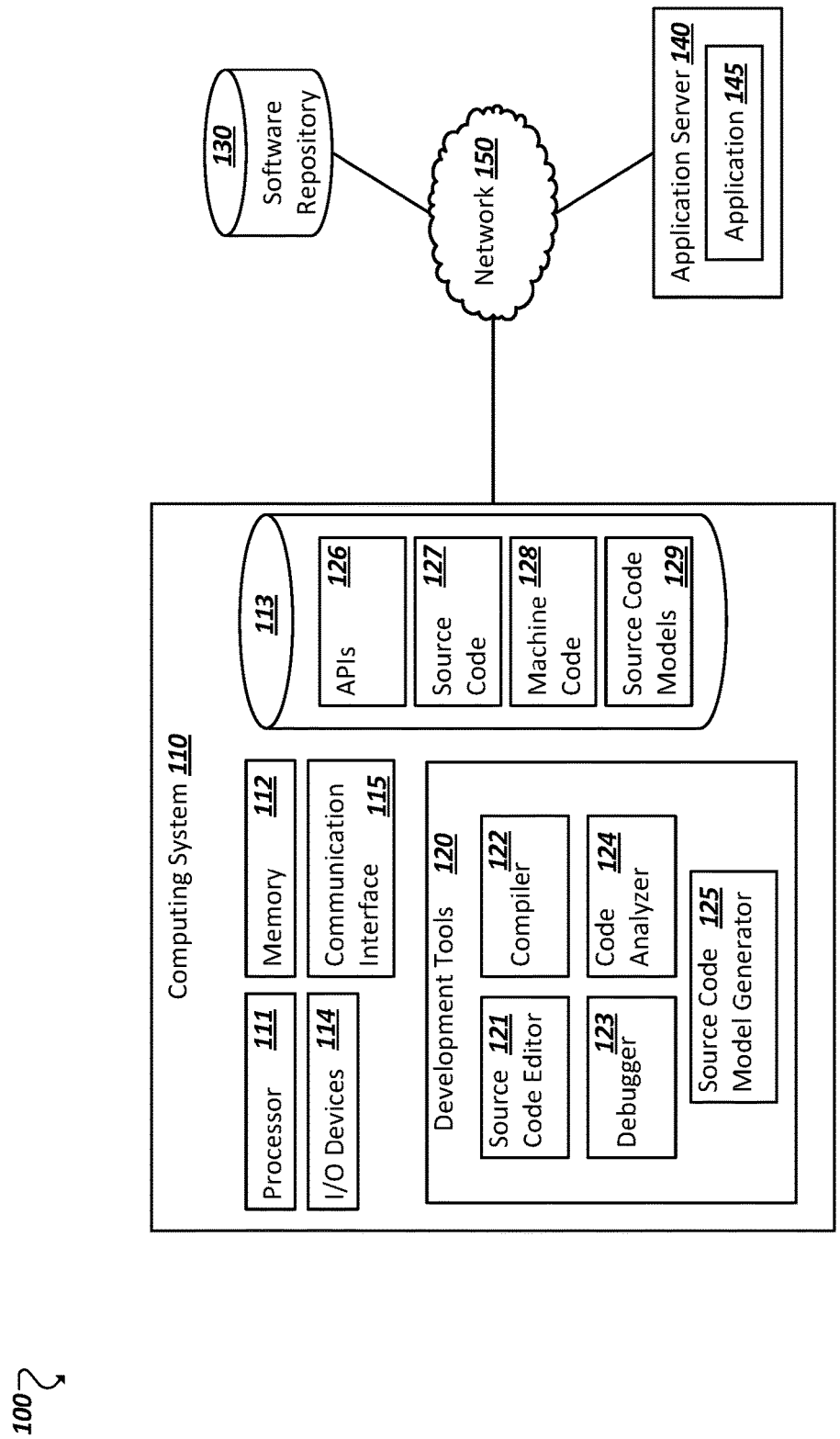
FIG. 1 illustrates an example computing environment that includes automated source code model generation functionality.

Program analysis typically refers to the process of automatically evaluating a computer program for correctness, such as to detect errors in the program (e.g., bugs and security flaws) or otherwise verify that the program operates as intended. For example, program analysis can be performed by analyzing the code associated with a program without executing the program, which is commonly referred to as static code analysis, and/or program analysis can be performed by executing a program and analyzing its behavior at runtime, which is commonly referred to as dynamic program analysis.

Static code analysis can be performed on a program using source code or machine code, but it is generally more effective when source code is used. Analyzing all of the source code relevant to a particular program or application can be problematic, however, as the source code of software libraries and other supporting functionality (e.g., operating system (OS) kernel services) is often unavailable, or even if available, is often too large or complicated to be analyzed effectively. As an example, software developers often do not have access to the source code of the libraries on which their application depends, such as a shared library distributed through a package manager.

One solution to this problem is to develop models for the supporting libraries and functionality, and then use those models when analyzing the source code of a program that relies on those libraries and functionality. Unfortunately, developing models is typically a highly manual, laborious, and error-prone process. Moreover, the best way of expressing a model often depends on the particular property the analyzer is trying to prove. As a result, many different models are often needed for the same functionality, such as one model for each property to be evaluated.

Thus, one of the key challenges facing program analysis relates to how the environment is modeled. By way of example, consider Microsoft's Windows Static Driver Verifier (SDV) and Windows device drivers. When analyzing a network driver, there are various options for how the Windows kernel APIs are treated in the analysis.

The first option is to analyze the driver along with the entire source code of the Windows, which includes several million lines of code in the core operating system (OS) kernel, including some assembly instructions.

The second option is to ignore the Windows source code and assume that each Windows kernel API is a no-op, as shown by the following example code:

```
NTSTATUS IoAllocateAdapterChannel(ADAPTER_OBJECT *
AdapterObject,
                                  DEVICE_OBJECT *
DeviceObject,
                                  ULONG NumberOfMapRegisters,
                                  DRIVER_CONTROL *
ExecutionRoutine,
                                  void * Context)
{
  return STATUS_SUCCESS;
}
```

The third option is to ignore the Windows OS source code and assume the worst case for each Windows kernel API, such as assuming that each API can return any possible value and can modify the input parameters, global variables, and heap in any arbitrary way, as shown by the following example code:

```
NTSTATUS IoAllocateAdapterChannel(ADAPTER_OBJECT *
AdapterObject,
                                  DEVICE_OBJECT *
DeviceObject,
                                  ULONG NumberOfMapRegisters,
                                  DRIVER_CONTROL *
ExecutionRoutine,
                                  void * Context)
{
```

```
    *AdaptorObject = nondeterminism( );
    *DeviceObject = nondeterminism( );
    *ExecutionRoutine = nondeterminism( );
    *Context = nondeterminism( );
    for (int i = 0; i<MAX_MEMORY_INDEX; i++)
        *i = nondeterminism( );
    return nondeterminism( );
}
```

The example code above assumes that the program analysis tool supports a primitive command named "nondeterminism( )", which uses symbolic methods to havoc the current state.

Finally, the fourth option is to build a compact environment model that overapproximates the real behavior of the Windows kernel APIs (e.g., relative to the behavioral property that is being checked or analyzed) in a way that allows the program analysis of interest to succeed, as shown by the following example code:

```
NTSTATUS IoAllocateAdapterChannel(ADAPTER_OBJECT *
AdaptorObject,
                                 DEVICE_OBJECT *
DeviceObject,
                                 ULONG NumberOfMapRegisters,
                                 DRIVER_CONTROL *
ExecutionRoutine,
                                 void * Context)
{
    if (nondeterminsm( )) {
        return STATUS_SUCCESS;
    } else {
        return STATUS_INSUFFICIENT_RESOURCES;
    }
}
```

The first option described above leads to scalability problems, as it requires millions of lines of code to be analyzed rather than only the code for the device driver, which generally contains a much smaller amount of code (e.g., 3,000-80,000 lines of code). Currently, however, there are no program analysis methods capable of analyzing the entire Windows OS source code with any level of precision. Moreover, since the Windows source code also includes assembly-level code with different command sequences for the many different processors that Windows might run on, this option also requires the design of the underlying microprocessor to be considered in the analysis.

The second and third options lead to an analysis with both false negatives (missed bugs) and false positives (bogus alarms). For example, the second option fails to model functionality which the program assumes is handled by the environment, while the third option pessimistically models the functionality of the environment such that the program is unable to rely on it. In practice, the second option leans towards missed bugs, while the third option leads to many false alarms.

The fourth option—building a compact model that overapproximates the real behavior of the environment—provides a better balance between scalability and precision than the other options. Accordingly, this is the approach used by the Windows SDV to model the environment for verifying Windows device drivers.

Creating the optimal environment model, however, is key to scalability and precision, from the perspective of both program analysis performance and the ability to provide a turnkey solution to users with no knowledge of program analysis. Writing an environment model is an art that even experts find tricky, however. For example, a good environment model is typically aware of the dark corners of the program analysis tool that will be used (e.g., the model may know not to use non-linear arithmetic, or that certain aspects of the system behavior should be tracked while other aspects can be dropped). Models also make deep use of difficult-to-understand concepts embodied in the "nondeterminism( )" and "assume( )" instructions (to establish assumed invariants). Moreover, models for symbolic program analysis tools are very different than those for explicit state-based analysis approaches.

In the example of the Windows SDV, many properties relate to the Interrupt Request Level (IRQL), and thus the state of the device driver's IRQL should be tracked by the environment model. Thus, with respect to the following example models of the KeGetCurrentIrql( )function, the first option provides a better abstraction of the KeGetCurrentIrql( )function than the second option, as the first option reflects the IRQL while the second option disregards it:
KRIQL KeGetCurrentIrql( ) {return Static_Driver_Verifier_irql;}
KRIQL KeGetCurrentIrql( ) {return nondeterminism( );}

Developing the environment model for the Windows SDV was a massive undertaking that required collaboration among numerous engineers for an extended amount of time. The Windows SDV, however, is a special case of a more general problem. For example, with respect to Windows device drivers, there are many programs that all link against exactly the same library. Thus, a custom-developed environment model for a single analysis tool (e.g., the Windows SDV) made sense, as the cost of writing the environment model was amortized over the years of use for its niche use case.

The situation is very different for more generic static code analyzers that are designed to analyze a wide variety of programs, as those programs are expected to link against a wide variety of libraries, the source code of which may or may not be available. As a result, the approach used to develop the Windows SDV environment model—writing custom model by hand—is infeasible for generic code analyzers due to the sheer number of libraries that may be encountered and the numerous properties that may be checked or analyzed for applications that use those libraries.

Accordingly, this disclosure presents a solution to the problem of modeling an environment of a computer program or other software component for purposes of performing a code analysis. In particular, the described solution can be used to automatically generate source code models for software functionality whose source code is either unavailable or too complex to analyze in its entirety. For example, an accurate environment model can be automatically generated for the software functionality based on its corresponding binary code (a.k.a., machine code). The generated source code model can then be used in connection with a code analysis performed on a program or application that relies on the particular software functionality, which improves the accuracy and precision of the code analysis.

Various examples of this solution are presented throughout this disclosure. Recapping the problem setting: a developer wishes to perform a static code analysis of a software application that depends on a software library whose source code is unavailable. A source code model can be generated for the software library based on its machine code, and a static code analysis can then be performed using the actual source code of the software application and the generated source code model for the software library. In this manner, the static code analysis performed on the software application is more precise, as the source code model enables the behavior of the library to be considered and evaluated as part of the analysis.

Referring now to FIG. 1, an example computing environment 100 for automatically generating source code models is shown. In various embodiments, for example, the automated source code model generation functionality described throughout this disclosure may be implemented using any or all of the components shown in computing environment 100. For example, in some embodiments, the source code model generation functionality described in connection with FIGS. 2-6 may be implemented using various components of computing system 110, such as processor 111, memory 112, storage device 113, source code model generator 125, and/or code analyzer 124, among other examples.

In the illustrated example, the computing environment 100 includes a computing system 110, a software repository 130, and an application server 140, which are communicatively coupled over a network 150 (e.g., a local area network (LAN) and/or a wide area network (WAN) such as the Internet).

The computing system 110 includes one or more processor(s) 111 (e.g., CPUs, GPUs, FPGAs, ASICs, special-purpose accelerators), one or more memory elements 112, one or more storage devices 113 (e.g., for persistent storage), one or more input/output (I/O) devices 114 (e.g., keyboard, mouse, display), and one or more communication interfaces 115 (e.g., to communicate with other external devices and systems, such as software repository 130 and/or application server 140 over network 150).

The computing system 110 also includes a collection of software development tools 120 (e.g., an integrated development environment (IDE) and associated development tools), such as a source code editor 121, compiler 122, debugger 123, code analyzer 124, and source code model generator 125, among other examples. In some embodiments, the software development tools 120 may be stored on the storage device 113 and/or in memory 112 and may be executed by processor 111. Moreover, data used by and/or associated with the software development tools 120 may be stored on the storage device 113, such as application programming interfaces (APIs) 126 (e.g., APIs of software libraries used by application 145), source code 127 (e.g., source code of application 145), machine code 128 (e.g., binaries of software libraries used by application 145), and source code models 129 (e.g., models generated from machine code 128 by source code model generator 125).

In various embodiments, the automated source code model generation functionality described throughout this disclosure may be implemented using any or all of the devices, systems, and/or components shown in computing environment 100.

Moreover, in some embodiments, the development tools 120 may be implemented as an IDE or compiler that is installed and run on a personal computer, among other examples. In other implementations, the development tools 120 may be provided as a software as a service (SaaS) or cloud-based service offering, hosted on one or more network-connected computing systems or servers, which other users may access over one or more networks 150.

In general, "servers," "clients," "computing devices," "network elements," "database systems," "user devices," and "systems," etc. in example computing environment 100, can include electronic computing devices operable to receive, transmit, process, store, or manage data and information associated with the computing environment. As used in this document, the term "data processing apparatus," "computer," "computing device," "processor," "processor device," or "processing device" is intended to encompass any suitable processing device and/or circuitry. For example, elements shown as single devices within the computing environment 100 may be implemented using multiple computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services.

For instance, in some implementations, computing system 110, software repository 130, and/or application server 140, and/or any other component, device, or system within computing environment 100 can be at least partially (or wholly) cloud-implemented, web-based, or distributed to remotely host, serve, or otherwise manage data, software services, and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
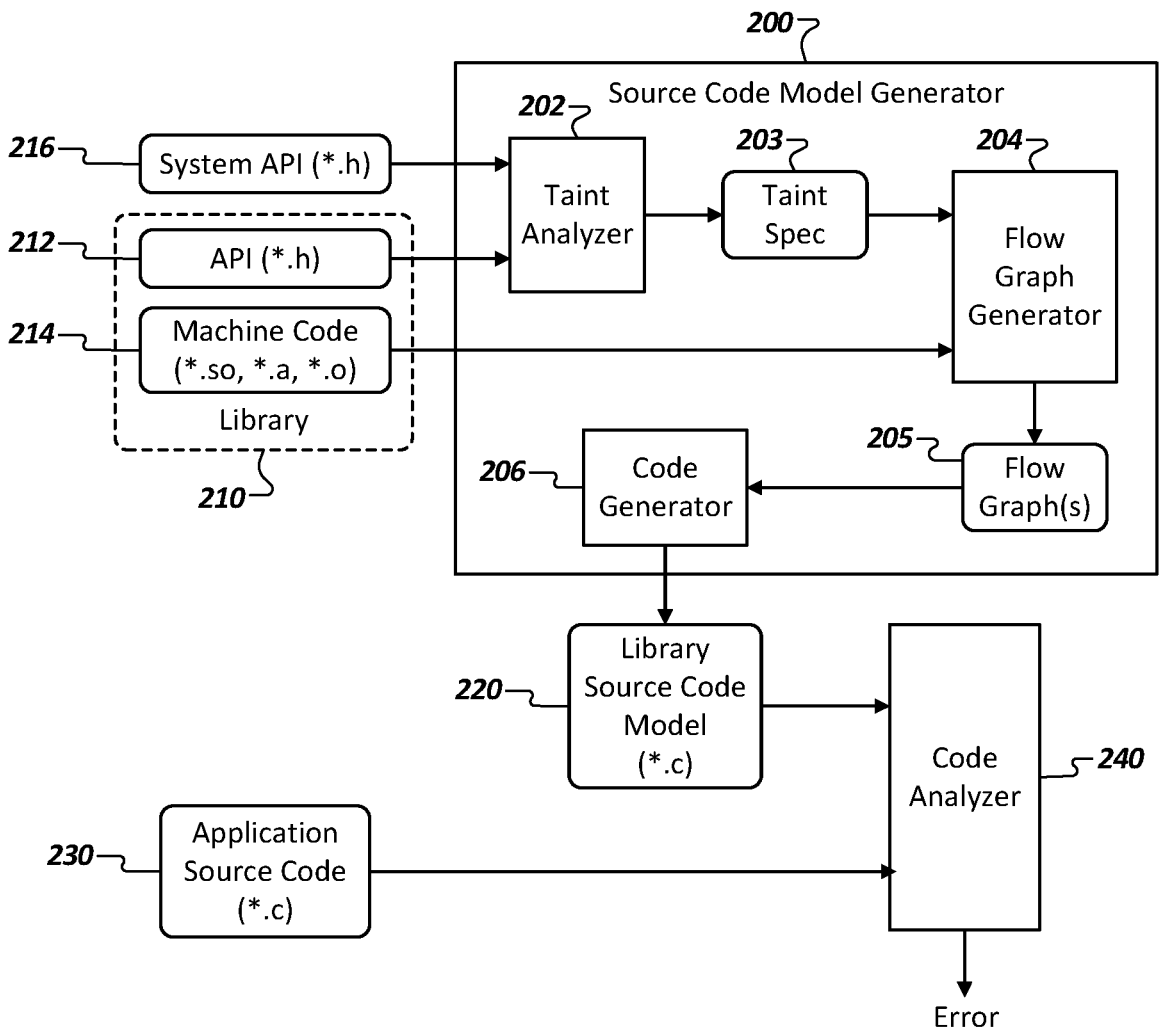
FIG. 2 illustrates an example embodiment of a source code model generator.

FIG. 2 illustrates an example embodiment of a source code model generator 200, which automatically generates source code models from machine code to detect errors in software via static code analysis. In some embodiments, the functionality of source code model generator 200 may be implemented using some or all of the components shown in computing environment 100 of FIG. 1.

In the illustrated example, the source code model generator 200 is used to generate a source code model 220 for a software library 210 whose source code is unavailable (e.g., based on the machine code 214 and application programming interfaces (APIs) 212, 216 associated with the software library 210). A code analyzer 240 is then used to detect errors in a software application that uses the library 210 by analyzing the source code 230 of the application in conjunction with the source code model 220 of the library.

In the illustrated embodiment, the algorithm used by the source code model generator 200 to generate the source code model 220 includes the following high-level steps (which are described in further detail below):
  (i) taint spec generation (e.g., generating taint specification(s) 203 identifying the data sources/sinks in model-specific functions of interest based on the API(s) 212, 216 associated with the library 210);
  (ii) flow graph generation (e.g., generating flow graph(s) 205 representing the data/control flow among the data sources/sinks in the taint specifications 203 based on micro-executing the library's machine code 214); and
  (iii) model generation (e.g., generating a source code model 220 that models the behavior of the library 210 based on the associated API(s) 212, 216 and flow graph(s) 205).

In the first step, a taint analyzer 202 generates taint specifications 203 for various functions of interest by analyzing various APIs 212, 216 associated with the library 210. An example of the process for generating a taint specification is shown and described below in connection with FIG. 4B.

For example, the functions of interest may include functions implemented by the library 210 (e.g., functions declared in the library's API 212 and implemented by its machine code 214) and various model-specific functions of interest that are simply used by the library 210 (e.g., system functions used by the library 210 that are declared in one or more system APIs 216, such as memory allocation/free functions).

Moreover, the taint specifications 203 may be generated by analyzing the APIs associated with the functions of interest, such as the API 212 associated with the functions implemented by the library 210 and any system API(s) 216 associated with relevant system functions used by the library. In some embodiments, for example, the APIs 212, 216 may be defined in C code header files (*.h) containing API function declarations.

The taint specification 203 for each function of interest may identify which values in the function are data sources or data sinks (or both), which may be determined by analyzing the corresponding function declaration in the API 212, 216 associated with the function. For example, the declaration of a function in a C header file of a particular API 212, 216 may be analyzed to identify the return type and arguments/parameters of the particular function, which may then be used to identify the values that are data sources, data sinks, or both.

As an example, data sources may include entry points into the library 210 being analyzed and outputs from model-relevant system functions (e.g., malloc( ) getenv( )), while data sinks may include exit points from the library 210 being analyzed and inputs to model-relevant system functions (e.g., free( ) memcpy( )). Moreover, some values may be both a data source and a data sink, such as pointed-to values from library inputs.

In the next step, a flow graph generator 204 generates flow graphs 205 to represent the data and/or control flow among the data sources/sinks in the functions implemented by the library 210. For example, the library's machine code 214 may be micro-executed in one or more virtual machines (VMs), and the data/control flows among the data sources/sinks identified in the taint specifications 203 for the various API functions may then be observed during execution. A flow graph can then be generated for each function to represent the observed flows among the data sources/sinks during execution of the function.

In some embodiments, for example, the library's machine code 214 may be contained in a binary file associated with the library 210 (e.g., *.so, *.a, or *.o). Moreover, the machine code 214 in the binary file may be lifted or translated into a simplified intermediate representation (IR), which is then micro-executed or interpreted in one or more virtual machines (VMs), with execution beginning at the entry point for each API function implemented by the library. In this manner, no harness is required to execute the machine code 214 (e.g., no additional test code or input data is needed). Moreover, branching instructions may be executed non-deterministically to allow analysis of multiple paths through the function (e.g., paths that are linearly independent). Further, in some embodiments, when a branch is encountered, separate VMs may be launched to execute each path of the branch.

Moreover, during execution of the library's machine code 214, a dynamic taint analysis may be performed to identify flows from data sources to data sinks as specified in the corresponding taint specifications 203. These flows may be represented as [source, sink] pairs in flow graphs 205 that are generated for the respective API functions. In some embodiments, for example, each value produced by a data source is assigned a unique taint identifier (ID). If a value given to a sink is tainted, the source is determined from the taint ID. The source-sink pair is then added to a corresponding flow graph.

In some embodiments, a binary analysis tool may be used to micro-execute the machine code 214 and perform the dynamic runtime analysis, such as the Binary Analysis Platform (BAP), which includes a micro-execution framework referred to as "Primus." For example, callbacks may be defined in BAP Primus to observe relevant moments during execution based on the taint specifications 203, and those moments may then be translated into nodes and edges in the resulting flow graphs 205.

Moreover, the flow graphs 205 used to represent the flows among the data sources/sinks may vary in form depending on the particular embodiment. In some embodiments, for example, a flow graph 205 may be implemented as a dynamic flow graph (DFG) and/or a control-dependent flow graph (CDFG), as described further below.

For example, a DFG may be used to represent model-relevant behavior as data flows, where nodes in the graph represent data sources, data sinks, or both, and edges in the graph represent flows between data sources/sinks. In this manner, nodes that only have outgoing edges are data sources, nodes that only have incoming edges only are data sinks, and nodes with outgoing and incoming edges are both data sources and sinks. An example of a DFG is shown and described below in connection with FIG. 4C.

Without additional information on control flow, however, a DFG results in a straight-line source code model 220 that ignores conditional branches, which is potentially over-precise. Thus, in some embodiments, a DFG may be augmented with additional information to reflect conditional branches that occur during runtime, which is referred to as an "augmented DFG" in this disclosure. For example, as noted above, when a conditional branch is encountered, separate VMs may be launched to execute each path of the branch independently. Thus, for each edge added to an augmented DFG to represent certain behavior at runtime, the edge can be annotated with the machine ID of the particular VM where that behavior occurred, such as machine 0 (m0), machine 1 (m1), and so forth. In this manner, the machine IDs can be used to identify the respective branch paths associated with the behavior represented in the augmented DFG, which enables the conditional branches to be reflected in the source code model 220 generated from the augmented DFG. An example of an augmented DFG is shown and described below in connection with FIG. 4D.

While the machine ID annotations in an augmented DFG provide some useful information on control flow, providing additional information on control flow may lead to even better models, particularly when the library 210 being analyzed includes multiple levels of nested conditionals. Thus, in some cases, a flow graph 205 may be implemented as a CDFG, which represents the flows among the data sources/sinks while also capturing additional control flow information. For example, a CDFG may connect the execution of related machines by identifying relationships that arise among different machines during micro-execution of the machine code 214, which may result in a more precise source code model 220 compared to that of a DFG.

In some embodiments, for example, a CDFG may include nodes representing source-sink data flows and other events, edges representing the control flow between those data flows/events, and edge annotations identifying the associated machine IDs. By way of comparison, in a CDFG the data flow between a data source/sink pair is represented as a node in the graph, whereas as in a DFG the same data flow is represented as an edge between two nodes representing the data source and sink. An example of a CDFG is shown and described below in connection with FIG. 4E.

In some embodiments, a CDFG may be generated by observing relevant control flow events during micro-execution of the machine code 214, such as starting and terminating a function, entering/exiting basic blocks, starting new virtual machines when branches are encountered (e.g., independently executing separate paths of a conditional branch in separate VMs), calls from inside the function, memory accesses, program counter changes, and so forth. In this manner, the CDFG can be generated to capture the overall control flow of the observed events. For example, various control flow events may be observed during micro-execution of the machine code 214, similar or related events may be joined together in the graph, and the traces of different machines may be connected in the graph via the machine splits corresponding to different branch paths.

In the final step, a code generator 206 generates a source code model 220 for the library 210 based on the associated flow graphs 205 and the APIs 212, 216. The generated model contains source code statements that model the behavior of each function defined in the API 212 and implemented by the library 210.

In some embodiments, for example, the source code model for each function is generated by:
 (i) generating a source code skeleton or shell for the function based on the corresponding function declaration in the API 212 implemented by the library 210;
 (ii) topologically sorting the flow graph 205 associated with the function to "flatten" the graph into a total order of edges (e.g., a topological order);
 (iii) synthesizing one or more source code statements (e.g., C statements) to emulate each data flow fact represented in the graph 205 (introducing temporary variables as needed to ensure proper flows induced by the function); and
 (iv) ordering the resulting source code statements according to the flow of the edges in the graph 205 (e.g., based on the topological order of the flattened graph).

For example, for a function represented by a DFG or augmented DFG, one or more source code statements may be emitted for each edge in the graph to emulate the data flow represented by the particular edge. Moreover, if the edges of the DFG are augmented with machine annotations, those annotations may be used to group source code statements from the same machine or branch path and generate additional source code statements to emulate the corresponding conditional branches.

For a function represented by a CDFG, the CDFG may be recursively visited to create temporary variables, functional statements, and branches, and the resulting source code statements may then be grouped based on the control flow behavior observed during micro-execution of the machine code 214, as represented in the CDFG.

Moreover, with respect to source code statements that are generated for conditional branches, the conditional guards in those branches may be implemented using various approaches. In some cases, for example, a conditional guard may be implemented using a randomization function (e.g., the rand( ) function, or nondeterminism( ), referenced above) to overapproximate its outcome and allow either branch path. Alternatively, the conditional guard may be represented using a formula that better serves the analysis being performed by the code analyzer 240.

Once the source code model 220 has been generated for the library 210, the code analyzer 240 can then look for errors in the application 230 that uses the library 210 by analyzing the source code 230 of the application together with the source code model 220 of the library. For example, the code analyzer 240 may check the application for memory leaks, tainted or unsafe inputs (e.g., unsanitized inputs from untrusted sources, which could lead to code injection exploits), out-of-bounds memory accesses (e.g., an array access via an out-of-bounds index), race conditions, null pointer exceptions, or dangling pointer dereferences, among many other examples.

Moreover, while the source code model in the illustrated example is generated in the C programming language, other embodiments may generate source code models for any programming language, including C, C++, Objective-C, Swift, Java, and so forth.

FIG. 3 illustrates an example 300 of generating a source code model for a software library for a code analysis on a software application that uses the library. In some embodiments, the functionality illustrated and described in connection with FIG. 3 may be implemented by the source code model generator 200 of FIG. 2.

As described further below, the illustrated example depicts an application programming interface (API) 302 associated with a software library, source code 304 for the software library, source code for an application 306 that uses the software library, and a source code model 308 generated based on the machine code for the software library.

In the illustrated example, the library API 302 is defined in a header file written in the C programming language (lib.h), which contains function declarations/specifications for the functions "make," "add," and "destroy":

lib.h

```
// makes a sorter that holds up to sz numbers
int *make(int sz);
// adds num to sorter of size sz
int add(int *sorter, int sz, int num);
// frees sorter
void destroy(int *sorter);
```

The library source code 304 is provided in a source code file written in C (lib.c), which contains source code that implements the functions declared in the library API 302 (e.g., source code implementations of the functions "make," "add," and "destroy"):

lib.c (actual)

```
int *make(int lim) {
    return calloc(lim, sizeof(int));
}
int add(int *csort, int lim, int num) {
    int num_ok=0<=num && num <lim;
    if (!num_ok) {return 1; 1
    csort[num]+=1;
    return 0;
}
void destroy(int *csort)
{free(csort);}
```

Moreover, the application source code 306 is similarly provided in a source code file written in C (app.c), which contains source code that calls the functions defined in the API and implemented in the software library (e.g., function calls to the "make," "add," and "destroy" functions):

app.c

```
include "lib.h"
int main(int argc, char *argv[ ]) {
    int *csort=*make(10);
    int r, err;
    for (int i=0; i<100; i++) {
        r=rand 0% 10+1;
        err=add(csort, 10, r);
        if (err) {return err;};}
    destroy(csort);
    return 0;
}
```

In this example, the actual source code 304 of the software library is shown for illustration purposes only. In many cases, the source code 304 of the library is unavailable to the developers of the application 306 that uses the library. For example, the source code 304 of the library is often compiled into executable machine code (a.k.a., binary code), and the machine code is then made available to those developers rather than the actual source code 304. In other cases, even when the source code is available, it may be too complex to analyze effectively.

As a result, without knowing what the library actually does or how it is implemented, a static code analyzer may miss bugs or signal false alarms when analyzing the source code 306 of the application that uses the library. For example, the source code 306 of the application (app.c) contains a bug in the form of a missed destructor call. Without the source code 304 of the library (lib.c), however, the analyzer ignores the library and thus fails to catch and flag the bug in the application.

Accordingly, the solution presented in this disclosure can be used to automatically generate a source code model 308 for the library using its machine code and associated API(s), which can then be used in connection with the code analysis on the application that uses the library. The process of generating the source code model 308 for the library using its machine code and associated API(s) is described in further detail throughout this disclosure.

In the illustrated example, the generated source code model 308 for the library contains source code that models the behavior of the functions implemented in the actual source code 304 of the library (e.g., the "make," "add," and "destroy" functions):

lib.c (model)

```
int *make(int lim)
{return malloc(0);}
int add ( . . . )
{return rand ( );}
void destroy(int *csort)
{free(csort);}
```

In particular, the source code model 308 captures behavior of the library functions that is relevant to the code analysis performed on the application that uses the library. In this manner, a code analyzer can consider the source code model 308 of the library in addition to the source code 306 of the application in a static code analysis of the application, which increases the precision of the code analysis and helps avoid missed bugs and false alarms. In the illustrated example, the source code model 308 reveals the allocation behavior of the library to the analyzer, which enables the analyzer to see and flag the bug in the application (which the analyzer would have otherwise missed if neither the model nor the actual source code of the library was provided to it).

FIGS. 4A-E illustrate various frameworks for generating a source code model for a software library. In some embodiments, the functionality illustrated and described in connection with FIGS. 4A-E may be implemented by the source code model generator 200 of FIG. 2.

Figure 4A:
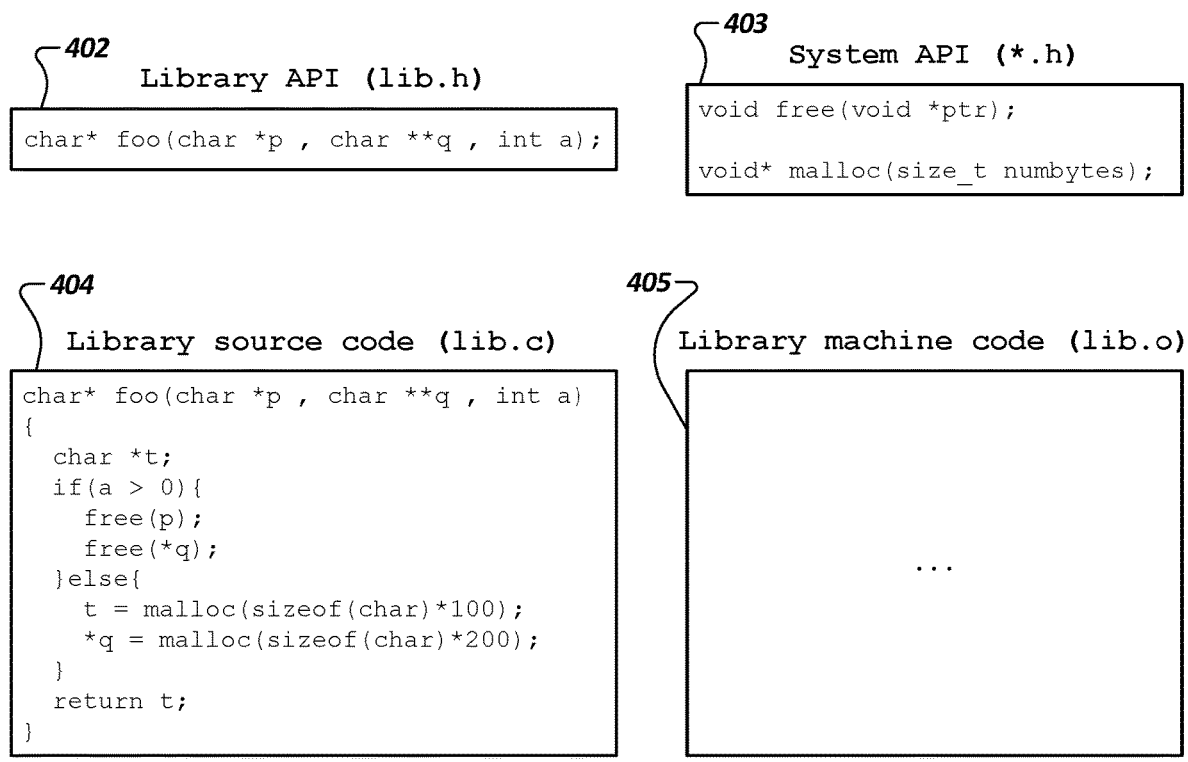
FIGS. 4A-E illustrate various frameworks for generating a source code model for a software library.

In the illustrated example, FIG. 4A depicts an API (lib.h) 402 for a software library, source code (lib.c) 404 for the software library, machine code (lib.o) 405 for the software library, and a system API (*.h) 403 for system functions used by the library, as described further below.

The library API (lib.h) 402 contains a function declaration for the "foo" function:

char* foo (char *p, char **q, int a);

The library source code (lib.c) 404 contains source code implementing the "foo" function declared in the library API 402:

```
char* foo (char *p, char **q, int a) {
    char *t;
    if (a >0) {
        free (p);
        free (*q);
    }else{
        t=malloc(sizeof(char)*100);
        q=malloc(sizeof(char)*200);
    }
    return t;
}
```

The library machine code (lib.o) 405 represents the executable machine code produced by compiling the source code (lib.c) 404 of the library.

Moreover, the system API (*.h) 403 contains function declarations for the system functions "free" and "malloc," both of which are used by the software library:

void free(void *ptr);

void* malloc(size_t numbytes);

For purposes of this example, it is assumed that the library API (lib.h) 402, system API 403, and machine code (lib.o) 405 of the library are all available, while the actual source code (lib.c) 404 of the library is unavailable. Without the source code 404 of the library, a code analysis performed on a software application that uses the library will be unreliable. To address this problem, a source code model (e.g., containing C code) can be generated for the library using the library API (lib.h) 402, system API 403, and library machine code (lib.o) 405, as described below. With respect to how close the generated source code model should be to the original source code 404, the goal of the generated model is to reflect the behavior of the library that is relevant to the code analysis performed on the application that uses the library.

Figure 4B:
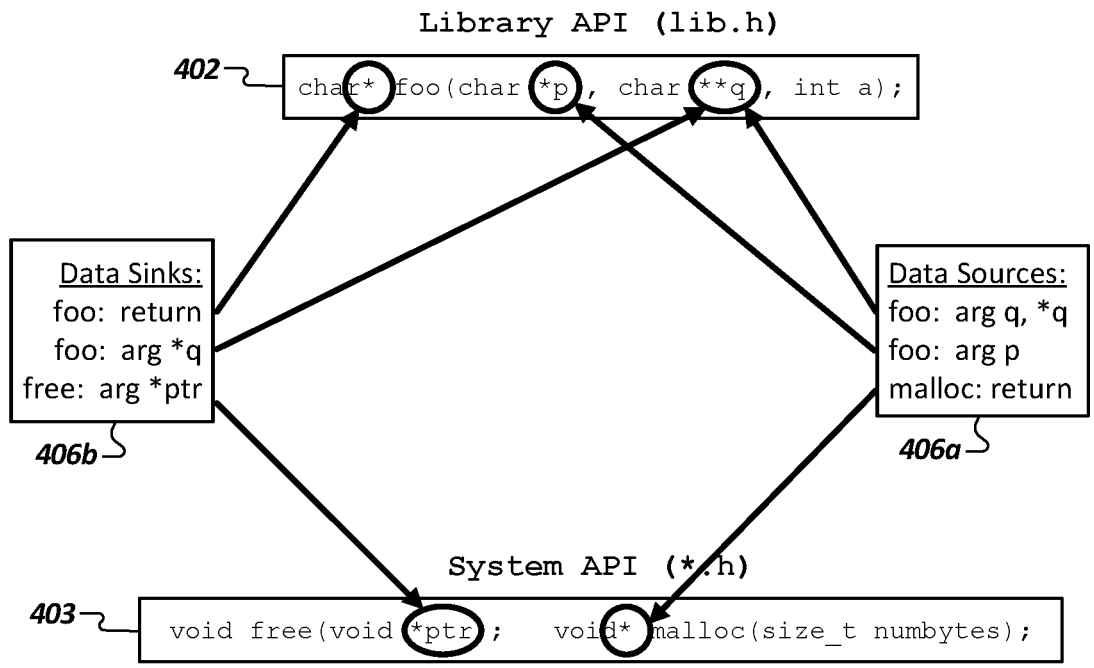

The first step involves generating taint specifications to identify the data sources and data sinks in the various functions that are implemented by or used by the software library, as shown in FIG. 4B. For example, the function declarations in the library API 402 and system API 403 are analyzed to identify the data sources and data sinks 406*a-b* in each function declared in those APIs. In the illustrated example, the identified data sources 406*a* include arguments q, *q, and p of the "foo" function and the return value of the "malloc" function, and the identified data sinks 406*b* include the return value of the "foo" function, argument *q of the "foo" function, and argument *ptr of the "free" function. A taint specification is then generated for each function, which identifies the respective data sources and data sinks 406*a-b* in that function.

After generating the taint specifications, the data flow and/or control flow among the data sources and sinks 406*a-b* identified in the taint specifications is then determined by performing a dynamic analysis on the machine code 405 associated with the library (e.g., by executing the machine code 405 and monitoring its behavior at runtime). In some embodiments, for example, the machine code 405 is micro-executed in one or more virtual machines (VMs), and the data flow and/or control flow among the data sources and data sinks 406*a-b* is monitored during micro-execution of the machine code 405.

One or more flow graphs are generated to represent the data flow and/or control flow observed at runtime, and those graph(s) are then used to generate source code statements to model the runtime behavior of the library, which collectively serve as the source code model for the library.

Figure 4C:
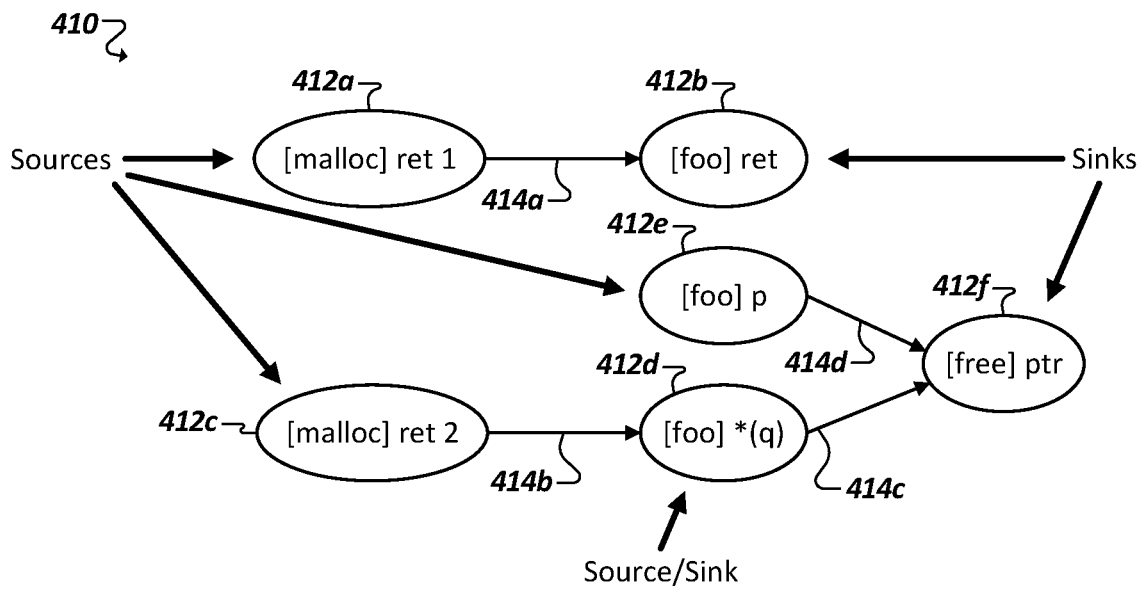

As an example, FIG. 4C illustrates a source code model 420 generated using a dynamic flow graph (DFG) 410. In the illustrated example, the DFG 410 represents the identified data flow among the data sources and sinks 406*a-b* in the software library, which is determined by executing the machine code 405 and observing the behavior of the library at runtime. In particular, the DFG 410 includes: (i) a set of nodes 412*a-f* to represent the respective data sources and data sinks 406*a-b* (e.g., where each node represents a particular data source and/or data sink); and (ii) a set of edges 414*a-d* among the nodes 412*a-f* to represent the data flow among the data sources and the data sinks (e.g., where each edge represents a data flow between a source/sink pair).

The graph 410 is then sorted or "flattened" based on a topological order, and source code statements are generated to model the data flow represented by each edge 414*b* in the graph 410. In the example of FIG. 4C, the resulting source code model (lib.c) 420 generated from the graph 410 contains the following code:

lib.c (model)

```
char *foo(char *p, char **q, int a){
    void *malloc1;
    void *malloc2;
    char *ret=0;
    free (p);
    free(*(q));
```

```
    malloc1=malloc(sizeof(char*));
    ret=malloc1;
    malloc2=malloc(sizeof(char*));
    (q)=malloc2;
    return ret;
}
```

Figure 4D:
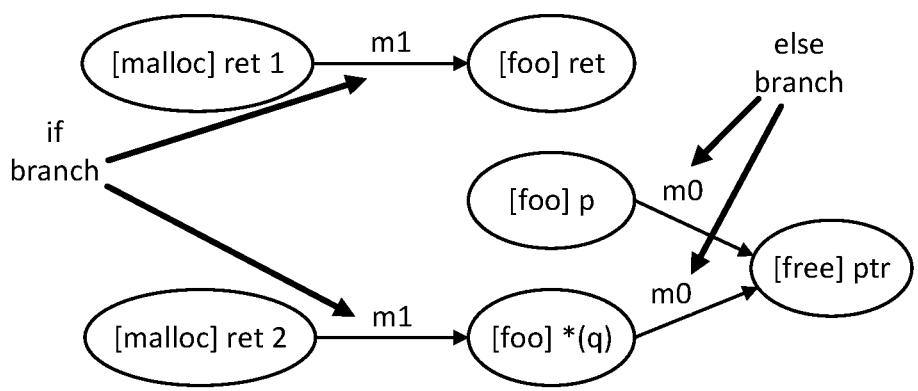

As another example, FIG. 4D illustrates a source code model 440 generated using an augmented DFG 430, which is a DFG that has been augmented with annotations on the edges to reflect conditional branches that occur during runtime. In some embodiments, for example, if a conditional branch is encountered during micro-execution of the machine code 405 within a virtual machine (VM), additional VMs are launched to micro-execute each path of the conditional branch. Moreover, when an edge is added to the augmented DFG 430 to represent certain runtime behavior of the library, the edge can be annotated with the machine ID of the particular VM where that behavior occurred, such as machine 0 (m0), machine 1 (m1), and so forth. In this manner, the machine IDs can be used to identify the respective branch paths associated with the behavior represented in the augmented DFG 430, which enables the conditional branches in the original source code 404 to be reflected in the source code model 440 generated from the augmented DFG 430.

In the example of FIG. 4D, the resulting source code model (lib.c) 440 generated from the augmented DFG 430 contains the following code (which reflects the conditional branches in the original source code 404):

lib.c (model)

```
char *foo(char *p, char **q, int a){
    void *malloc1;
    void *malloc2;
    char *ret=0;
    if (rand( )){
        free (p);
        free(*(q));
    }else{
        malloc1=malloc(sizeof(char*));
        ret=malloc1;
        malloc2=malloc(sizeof(char*));
        (q)=malloc2;
    }
    return ret;
}
```

Figure 4E:
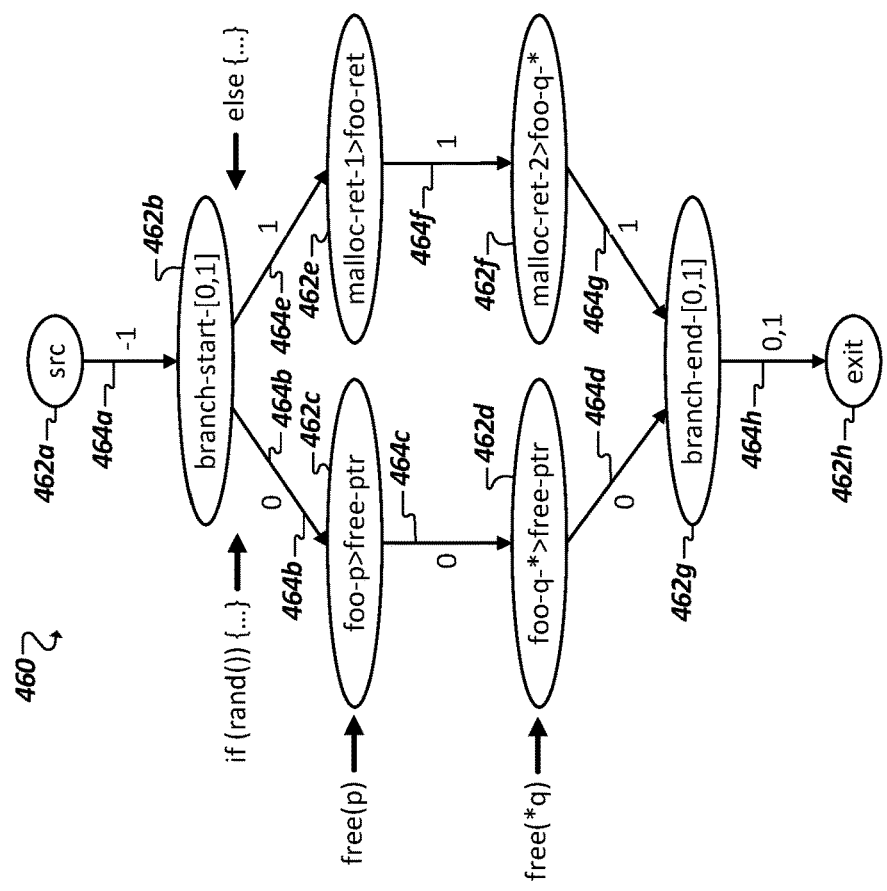

As another example, FIG. 4E illustrates a source code model 470 generated using a control-dependent flow graph (CDFG) 460. In the CDFG 460, the nodes 462*a-h* represent control flow events during runtime (e.g., initial source/entry 462*a*, branch start 462*b*, branch end 462*g*, data flows between data source/sink pairs 462*c-f*, exit 462*h*), while the edges 464*a-h* represent the flows between those events.

By way of comparison, in the CDFG 460, the data flow between a data source/sink pair is represented as a node 462*c-f* in the graph, whereas as in a DFG, the same data flow is represented as an edge between two nodes representing the data source and sink.

Moreover, the CDFG 460 is generated by parsing the runtime events 450 observed during micro-execution of the machine code 405. In the illustrated example, the CDFG 460 is generated based on the following runtime events 450:

Runtime Events (system-start bap:legacy-main)
(call (entry-foo))

```
(call (foo 0x40 0x80 0xC8))
(machine-fork (0 1))
(machine-switch (1 0))
(call (free 0x40))
(flow (0 foo-p free-ptr))
(call-return (free 0x40 0))
(call (free 0xAA76851DA82CD363))
(flow (0 foo-q-* free-ptr))
(call-return (free 0xAA76851DA82CD363 0))
(call-return (entry-foo 0x8F22CE3DB5A0040B))
(system-stop bap:legacy-main)
```

Once the CDFG 460 has been generated based on the observed runtime events 450, the CDFG 460 can then be used to generate a corresponding source code model 470 for the library, as described above.

In the example of FIG. 4E, the source code model 470 generated using the CDFG 460 is essentially the same as the source code model 440 generated using the augmented DFG 430 in FIG. 4D. In other cases, however, a CDFG may produce a more precise source code model than a DFG, particularly for a software library with multiple levels of nested conditionals.

Figure 5:
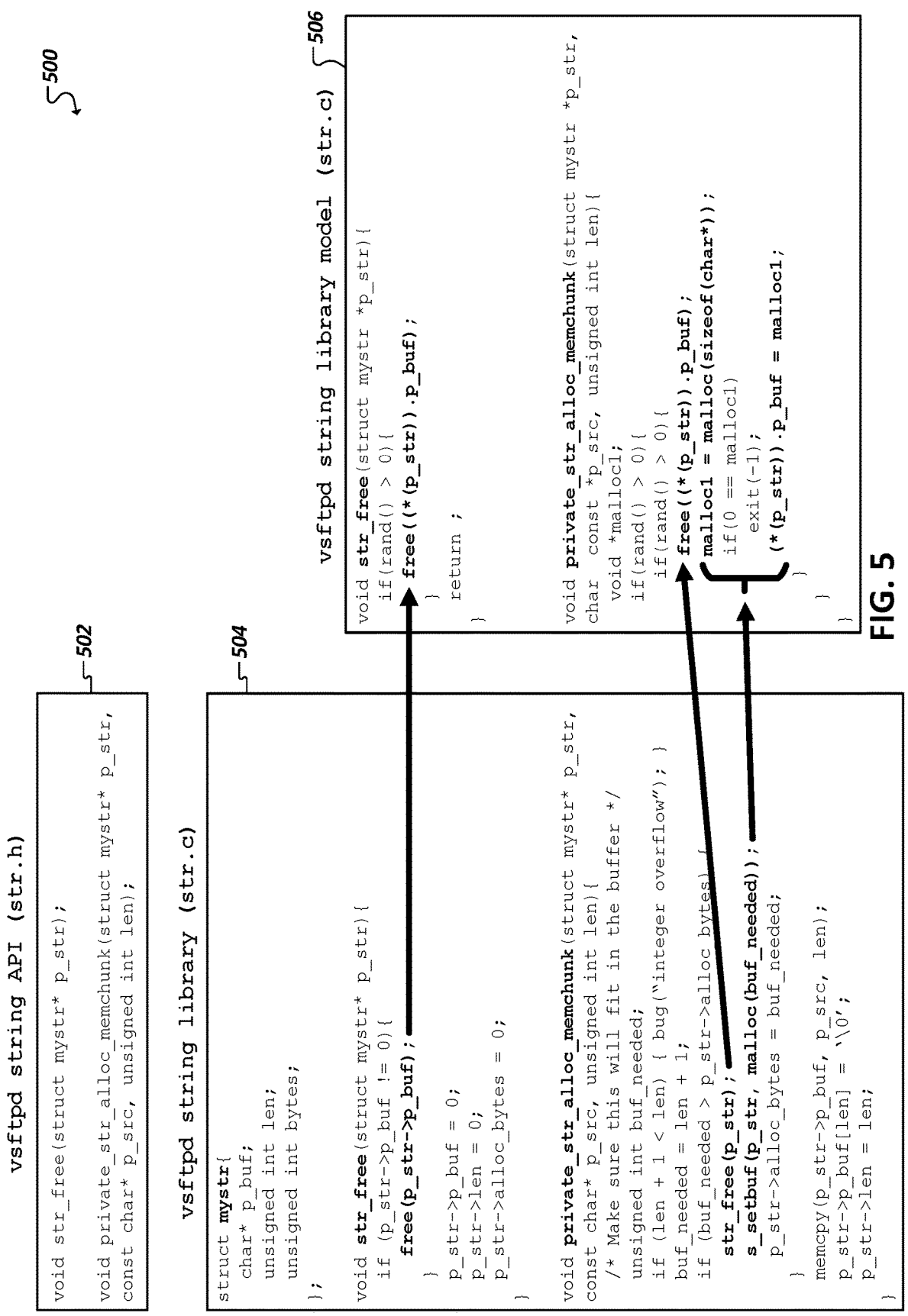
FIG. 5 illustrates a real-world example of source code model generation and code analysis for the very secure file transfer protocol daemon (vsftpd).

FIG. 5 illustrates a real-world example 500 of source code model generation for the string library in the very secure file transfer protocol (FTP) daemon (vsftpd) for a code analysis on vsftpd. In the illustrated example, select portions of the vsftpd string API (str.h) 502, vsftpd string library (str.c) 504, and corresponding vsftpd string library model (str.c) 506 are shown for purposes of simplicity.

In the illustrated example, the vsftpd string API (str.h) 502 includes function declarations for the functions "str_free" and "private_str_alloc_memchunk":

str.h

```
void str_free(struct mystr* p_str);
void private_str_alloc_memchunk(struct mystr* p_str,
    const char*
p_src, unsigned int len);
```

The vsftpd string library (str.c) 504 includes source code implementations of the "str_free" and "private_str_alloc_memchunk" functions from the vsftpd string API 502:

str.c (actual)

```
struct mystr{
   char* p_buf;
   unsigned int len;
   unsigned int bytes;
};
void str_free(struct mystr* p_str){
   if (p_str->p_buf !=0){
      free(p_str->p_buf);
   }
   p_str->p_buf=0;
   p_str->len=0;
   p_str->alloc_bytes=0;
}
void private_str_alloc_memchunk(struct mystr* p_str,
   const char* p_src, unsigned int len){
   /* Make sure this will fit in the buffer */unsigned
   int buf_needed;
   if (len+1<len) {
      bug("integer overflow");
   }
   buf_needed=len+1;
   if (buf_needed >p_str->alloc_bytes) {
      str_free(p_str);
      s_setbuf(p_str, malloc(buf_needed));
      p_str->alloc_bytes=buf_needed;
   }
   memcpy(p_str->p_buf, p_src, len);
   p_str->p_buf[len]='\0';
   p_str->len=len;
}
```

The actual source code 504 of the vsftpd string library is shown for illustration purposes only. In this example, it is assumed that the source code 504 of the vsftpd string library is unavailable, but the API 502 for the string library and the machine code produced from the compiled source code 504 are both available, along with all other source code of the vsftpd application (not shown) other than the string library.

Thus, since the source code of the vsftpd string library is assumed to be unavailable, a source code model 506 for the vsftpd string library is generated based on the vsftpd string API 502 and the machine code for the vsftpd string library using the automated source code model generation functionality described throughout this disclosure.

In the illustrated example, the resulting vsftpd string library model (str.c) 506 includes source code that models the behavior of the "str_free" and "private_str_alloc_memchunk" functions for purposes of performing a code analysis on the vsftpd application:

str.c (model)

```
void str_free(struct mystr *p_str) {
   if(rand( ) > 0){
      free((*(p_str)).p_buf);
   }
   return ;
}
void private_str_alloc_memchunk(struct mystr *p_str, char const
*p_src, unsigned int len){
   void *malloc1;
   if(rand( ) > 0) {
      if(rand( ) > 0) {
         free((*(p_str)).p_buf);
         malloc1 = malloc(sizeof(char*));
         if(0 == malloc1)
            exit(-1);
         (*(p_str)).p_buf = malloc1;
      }
   }
}
```

While only select portions of the vsftpd string API 502, string library source code 504, and string library model 506 are shown above for purposes of simplicity, the model generation was performed on the API and machine code for the entire vsftpd string library. The actual source code of the vsftpd string library (str.c) contains 724 lines of C code, which includes many functions that allocate and release memory. By comparison, the generated source code model for the library contains 415 lines of C code (with "sanity checks" for malloc, and inlining the function calls made by functions listed in the API (str.h), contributing to the size of the model).

The vsftpd application was then analyzed using a static code analyzer (e.g., the Infer open-source static analyzer) in each of the following scenarios: (i) using the full source code of the vsftpd application (including the source code of the string library); (ii) using the source code of the vsftpd application without the source code of the string library (e.g., with the string library only available in machine code or binary form); and (iii) using the source code of the vsftpd application with the source code model of the string library rather than its actual source code.

The code analyzer detected a memory leak in the analysis of the full vsftpd source code and in the analysis of the vsftpd source code when the source code model of the string library was used rather than the actual source code. However, no memory leak was detected in the analysis of the vsftpd source code when the string library was only available as machine code rather than source code.

Figure 6:
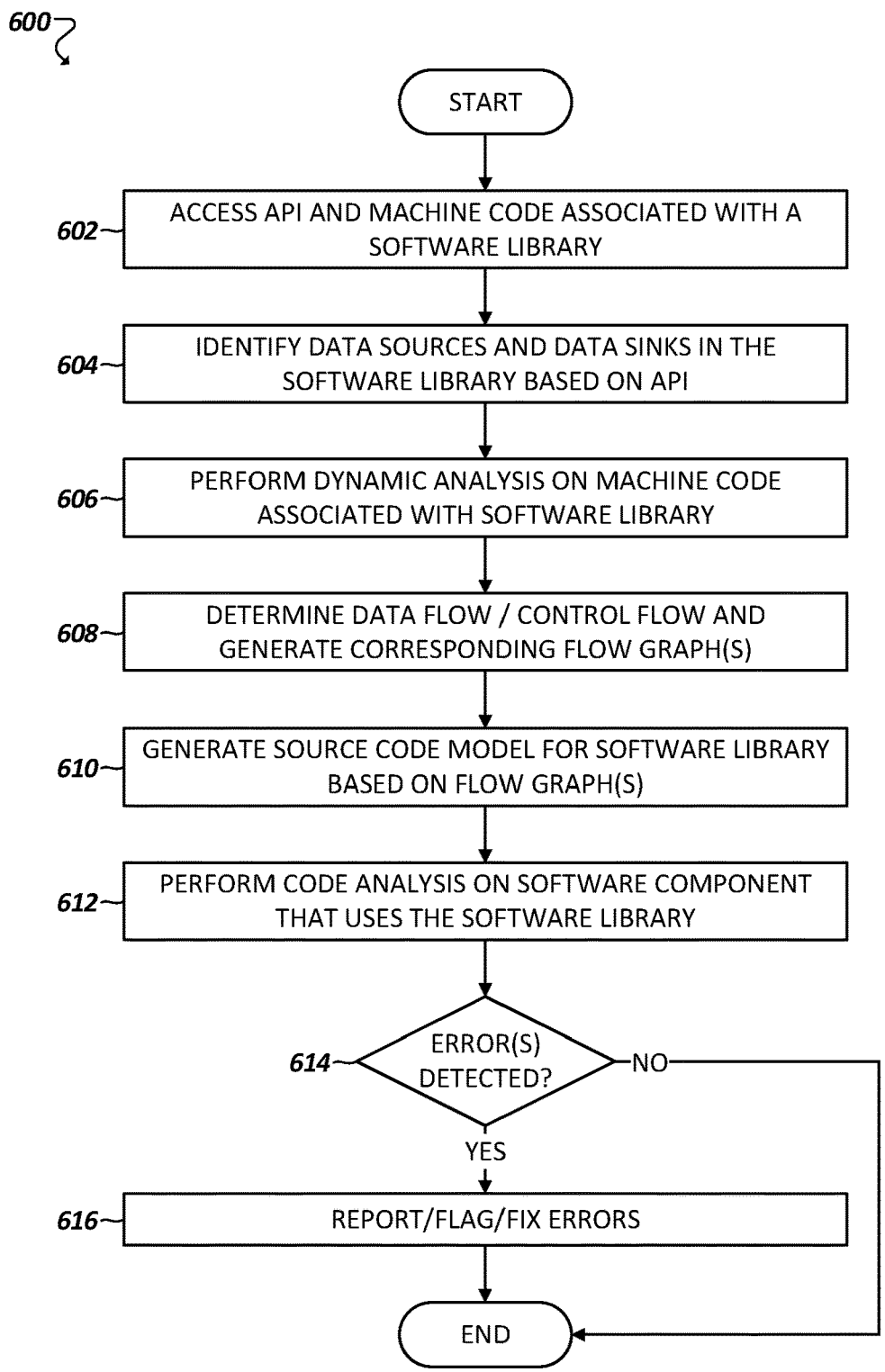
FIG. 6 illustrates a flowchart for generating a source code model from machine code for a code analysis.

FIG. 6 illustrates a flowchart 600 for generating a source code model from machine code for a code analysis. In some embodiments, flowchart 600 may be implemented and/or performed by or using the computing devices, systems, and/or environments described throughout this disclosure (e.g., the computing systems and devices in FIG. 1).

The flowchart begins at block 602 by accessing an application programming interface (API) and machine code associated with a software library. The software library includes software implementations of various functionality that can be used by other software components that depend on the library (e.g., computer programs, software applications, software frameworks, other software libraries, and/or any other software components).

The API defines a software interface that is fully or partially implemented by the software library, which other software components can use to interact with the software library and leverage its functionality. In some embodiments, the API may be defined in a source code header file associated with the software library (e.g., a C/C++ header file).

As an example, the API may include a declaration or specification of one or more functions, methods, or procedures. The declaration or specification of a particular function in the API may include a function name, a list of arguments or parameters (e.g., argument names and types), a return type, and so forth. Moreover, the software library may include software implementations of some or all of the functions declared or specified in the API.

Moreover, the software library may be written in a higher-level programming language (e.g., C/C++, Java), and a software compiler may be used to compile its source code into executable machine code. The machine code may contain native code or instructions that can be executed by a particular machine or processor in order to perform the functionality implemented by the software library. In some embodiments, for example, the machine code may contain binary code, such as a sequence of instructions represented in binary form (e.g., using zeros and ones in the base-two numeral system) that the particular machine or processor is designed to execute.

The flowchart then proceeds to block 604 to identify data sources and data sinks in the software library based on the API. In some embodiments, for example, function specifications for various functions associated with the software library are accessed, data sources and data sinks are identified by analyzing the function specifications, and taint specifications for the various functions are generated to indicate the respective data sources and data sinks in each function. In particular, the function specifications that are accessed and analyzed to identify the data sources and sinks may include: (i) a set of function specifications defined in the API for a set of library functions implemented by the software library; and (ii) a set of function specifications defined in one or more system APIs for a set of system functions called by the library functions (e.g., malloc, free).

The flowchart then proceeds to block 606 to perform a dynamic analysis on the machine code associated with the software library. For example, a runtime analysis may be performed on the machine code to determine the runtime behavior of the software library. In this manner, the data flow among the various data sources and data sinks can be observed based on the runtime behavior of the software library.

In some embodiments, for example, the machine code associated with the software library is executed and the behavior of the library is monitored during execution. The machine code may be executed in any suitable manner, including micro-executing the machine code in one or more virtual machines (VMs), directly executing the machine code on a host physical machine, and/or simulating execution of the machine code, among other examples. Moreover, the behavior of the software library (e.g., data flow and/or control flow) is monitored during execution of the machine code.

In some embodiments, for example, the machine code is micro-executed in one or more virtual machines (VMs), and the data flow among the data sources and data sinks is monitored during micro-execution of the machine code.

The flowchart then proceeds to block 608 to determine the data flow and/or control flow among the data sources and sinks and generate corresponding flow graphs (e.g., dynamic flow graphs (DFGs), augmented DFGs, and/or control-dependent flow graphs (CDFGs)). In some embodiments, for example, the data flow among the data sources and sinks is determined based on monitoring or observing the data flow during execution of the machine code at block 606. Moreover, one or more flow graphs associated with the software library may then generated to represent the identified data flow among the data sources and sinks (e.g., contingent on the flow of control).

In some embodiments, for example, a flow graph may be implemented as a DFG or an augmented DFG, which may include: (i) a set of nodes to represent the respective data sources and data sinks (e.g., where each node represents a particular data source and/or data sink); (ii) a set of edges among the nodes to represent the data flow among the data sources and the data sinks (e.g., where each edge represents a data flow between a data source/sink pair); and/or (iii) a set of annotations associated with the edges to represent conditional branches associated with the data flow among the data sources and sinks (e.g., an identifier of a particular machine or branch path in which the behavior occurred).

Alternatively, in some embodiments, a flow graph may be implemented as a CDFG (which may be generated in addition to, or as an alternative to, the DFG). For example, the control flow of the software library may be determined by monitoring or observing the control flow during execution of the machine code at block 606. A CDFG associated with the software library may then generated to represent the identified control flow of the software library based on the execution of the machine code. In some embodiments, for example, the CDFG may include: (i) a set of nodes to represent control flow events, such as data flow events among the data sources and the data sinks (e.g., where each node represents a data flow between a data source/sink pair); (ii) a set of edges among the nodes to represent a control flow among the respective data flows (e.g., where each edge represents a control flow between the respective data flows of multiple data source/sink pairs); and/or (iii) a set of annotations associated with the edges to represent conditional branches associated with the control flow (e.g., an identifier of a particular machine or branch path in which the behavior occurred).

The flowchart then proceeds to block 610 to generate a source code model for the software library based on the flow graph. The source code model may include a collection of source code statements that collectively model some or all of the behavior of the software library, such as behavior of the library that is relevant to performing a code analysis on another software component or application that uses the library.

In some embodiments, for example, the source code model may be generated at least partially based on a DFG. In particular, the model may be generated to include source code statements that model the data flow represented in the DFG, such as by generating one or more corresponding source code statements for each edge in the DFG.

As an example, the source code model may be generated by: (i) determining a topological order for the DFG by performing a topological sort to "flatten" the graph; (ii) generating source code statements to model the data flow in the DFG (e.g., with one or more statements generated for each edge in the graph); and (iii) ordering the source code statements in the model based on the topological order determined for the DFG.

In other embodiments, the source code model may be generated at least partially based on a CDFG, either in combination with the DFG or as an alternative to the DFG.

The flowchart then proceeds to block 612 to perform a code analysis on a particular software component or application that uses the software library. For example, the source code associated with the software component is first retrieved or accessed. Next, a code analysis is performed to detect errors in the software component based on: (i) the source code associated with the software component; and (ii) the generated source code model associated with the software library.

The flowchart then proceeds to block 614 to determine whether any errors or bugs are detected in the software component based on the code analysis, such as memory leaks, tainted or unsafe inputs (e.g., unsanitized inputs from untrusted sources, which could lead to code injection exploits), out-of-bounds memory accesses (e.g., array access via an out-of-bounds index), race conditions, null pointer exceptions, or dangling pointer dereferences, among many other possible types of errors or bugs.

If no errors are detected in the software component, the flowchart may be complete. If one or more error(s) are detected, however, the flowchart proceeds to block 616 to report, flag, and/or fix the errors.

At this point, the flowchart may be complete. In some embodiments, however, the flowchart may restart and/or certain blocks may be repeated. For example, in some embodiments, the flowchart may restart at block 602 to continue generating source code models and/or performing code analysis using the generated models.

The flowcharts and block diagrams in the figures illustrate the architecture, functionality, algorithms, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium (e.g., a non-transitory storage medium) produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention claimed is:

1. A method, comprising:
accessing an application programming interface (API) associated with a software library, wherein the API is at least partially implemented by the software library;
accessing machine code associated with the software library;
identifying, based on the API associated with the software library, a plurality of data sources and a plurality of data sinks in the software library;
determining, based on a dynamic analysis of the machine code associated with the software library, a data flow among the plurality of data sources and the plurality of data sinks;
generating a flow graph associated with the software library, wherein the flow graph represents the data flow among the plurality of data sources and the plurality of data sinks; and
generating, based at least in part on the flow graph, a source code model associated with the software library.

2. The method of claim 1, further comprising:
accessing source code associated with a software component that uses the software library;
performing a code analysis on the software component, wherein the code analysis is performed based on:
the source code associated with the software component; and
the source code model associated with the software library; and
detecting one or more errors in the software component based on the code analysis.

3. The method of claim 1, wherein identifying, based on the API associated with the software library, the plurality of data sources and the plurality of data sinks in the software library comprises:
accessing a plurality of function specifications for a plurality of functions associated with the software library; and
generating a plurality of taint specifications for the plurality of functions associated with the software library, wherein the plurality of taint specifications indicate the plurality of data sources and the plurality of data sinks in the plurality of functions.

4. The method of claim 3, wherein accessing the plurality of function specifications for the plurality of functions associated with the software library comprises:
accessing a first set of function specifications for a set of library functions implemented by the software library, wherein the first set of function specifications are defined by the API associated with the software library; and
accessing a second set of function specifications for a set of system functions called by the set of library functions, wherein the second set of function specifications are defined by one or more system APIs associated with the set of system functions.

5. The method of claim 1, wherein determining, based on the dynamic analysis of the machine code associated with the software library, the data flow among the plurality of data sources and the plurality of data sinks comprises:
  performing a runtime analysis on the machine code associated with the software library, wherein a runtime behavior of the software library is determined based on the runtime analysis; and
  determining, based on the runtime behavior of the software library, the data flow among the plurality of data sources and the plurality of data sinks.

6. The method of claim 1, wherein determining, based on the dynamic analysis of the machine code associated with the software library, the data flow among the plurality of data sources and the plurality of data sinks comprises:
  micro-executing the machine code associated with the software library in one or more virtual machines; and
  monitoring the data flow among the plurality of data sources and the plurality of data sinks during micro-execution of the machine code.

7. The method of claim 1, wherein the flow graph comprises a dynamic flow graph (DFG) to represent the data flow among the plurality of data sources and the plurality of data sinks, wherein the DFG comprises:
  a plurality of nodes, wherein the plurality of nodes represent the plurality of data sources and the plurality of data sinks; and
  a plurality of edges, wherein the plurality of edges represent the data flow among the plurality of data sources and the plurality of data sinks.

8. The method of claim 7, wherein the DFG further comprises:
  a plurality of annotations associated with the plurality of edges, wherein the plurality of annotations represent conditional branches associated with the data flow among the plurality of data sources and the plurality of data sinks.

9. The method of claim 7, wherein generating, based at least in part on the flow graph, the source code model associated with the software library comprises:
  generating a plurality of source code statements to model the data flow represented in the DFG, wherein the plurality of source code statements comprise one or more corresponding source code statements generated for each edge in the DFG.

10. The method of claim 9, wherein generating, based at least in part on the flow graph, the source code model associated with the software library further comprises:
  determining a topological order for the DFG; and
  ordering the plurality of source code statements based on the topological order determined for the DFG.

11. The method of claim 1, wherein the flow graph comprises a control-dependent flow graph (CDFG), wherein the CDFG represents a plurality of control flow events identified based on the dynamic analysis of the machine code associated with the software library, wherein the plurality of control flow events comprise a plurality of data flow events among the plurality of data sources and the plurality of data sinks.

12. The method of claim 11, wherein the CDFG comprises:
  a plurality of nodes, wherein the plurality of nodes represent the plurality of control flow events;
  a plurality of edges, wherein the plurality of edges represent a control flow among the plurality of control flow events; and
  a plurality of annotations associated with the plurality of edges, wherein the plurality of annotations represent conditional branches associated with the control flow.

13. The method of claim 1, wherein the API associated with the software library is defined in a source code header file associated with the software library.

14. A non-transitory machine-readable storage medium with instructions stored thereon, wherein the instructions, when executed by a machine, cause the machine to:
  access an application programming interface (API) associated with a software library, wherein the API is at least partially implemented by the software library;
  access machine code associated with the software library;
  identify, based on the API associated with the software library, a plurality of data sources and a plurality of data sinks in the software library;
  determine, based on a dynamic analysis of the machine code associated with the software library, a data flow among the plurality of data sources and the plurality of data sinks;
  generate a flow graph associated with the software library, wherein the flow graph represents the data flow among the plurality of data sources and the plurality of data sinks; and
  generate, based at least in part on the flow graph, a source code model associated with the software library.

15. The storage medium of claim 14, wherein the instructions, when executed by the machine, further cause the machine to:
  access source code associated with a software component that uses the software library;
  perform a code analysis on the software component, wherein the code analysis is performed based on:
    the source code associated with the software component; and
    the source code model associated with the software library; and
  detect one or more errors in the software component based on the code analysis.

16. The storage medium of claim 14, wherein the instructions that cause the machine to identify, based on the API associated with the software library, the plurality of data sources and the plurality of data sinks in the software library further cause the machine to:
  access a plurality of function specifications associated with the software library, wherein the plurality of function specifications comprise:
    a first set of function specifications for a set of library functions implemented by the software library, wherein the first set of function specifications are defined by the API associated with the software library; and
    a second set of function specifications for a set of system functions called by the set of library functions, wherein the second set of function specifications are defined by one or more system APIs associated with the set of system functions; and
  generate a plurality of taint specifications for a plurality of functions, wherein the plurality of functions comprise the set of library functions and the set of system functions, and wherein the plurality of taint specifications indicate the plurality of data sources and the plurality of data sinks in the plurality of functions.

17. The storage medium of claim 14, wherein the instructions that cause the machine to determine, based on the dynamic analysis of the machine code associated with the software library, the data flow among the plurality of data sources and the plurality of data sinks further cause the machine to:

micro-execute the machine code associated with the software library in one or more virtual machines; and monitor the data flow among the plurality of data sources and the plurality of data sinks during micro-execution of the machine code.

18. The storage medium of claim 14, wherein the instructions that cause the machine to generate, based at least in part on the flow graph, the source code model associated with the software library further cause the machine to:

determine a topological order for the flow graph;

generate a plurality of source code statements to model the data flow represented in the flow graph; and order the plurality of source code statements based on the topological order determined for the flow graph.

19. A computing system, comprising:

a memory to store an application programming interface (API) and machine code associated with a software library, wherein the API is at least partially implemented by the software library; and a processor to:

access, on the memory, the API and the machine code associated with the software library;

identify, based on the API, a plurality of data sources and a plurality of data sinks in the software library;

determine, based on a dynamic analysis of the machine code, a data flow among the plurality of data sources and the plurality of data sinks in the software library;

generate a flow graph associated with the software library, wherein the flow graph represents the data flow among the plurality of data sources and the plurality of data sinks; and generate, based at least in part on the flow graph, a source code model associated with the software library.

20. The computing system of claim 19, wherein:

the memory is further to store source code associated with a software component that uses the software library; and the processor is further to:

access, on the memory, the source code associated with the software component that uses the software library;

perform a code analysis on the software component, wherein the code analysis is performed based on the source code associated with the software component and the source code model associated with the software library; and detect one or more errors in the software component based on the code analysis.

* * * * *